(12) United States Patent
Takatani (10) Patent No.: US 11,081,287 B2
(45) Date of Patent: Aug. 3, 2021

(54) ELECTROLYTIC CAPACITOR AND METHOD FOR MANUFACTURING ELECTROLYTIC CAPACITOR

(71) Applicant: Panasonic Intellectual Property Management Co., Ltd., Osaka (JP)

(72) Inventor: Kazuhiro Takatani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 18 days.

(21) Appl. No.: 16/656,161

(22) Filed: Oct. 17, 2019

(65) Prior Publication Data

US 2020/0135408 A1   Apr. 30, 2020

(30) Foreign Application Priority Data

Oct. 31, 2018 (JP) .............................. JP2018-206120

(51) Int. Cl.
| | |
|---|---|
| *H01G 9/028* | (2006.01) |
| *H01G 9/00* | (2006.01) |
| *H01G 9/042* | (2006.01) |
| *H01G 11/48* | (2013.01) |
| *H01G 11/52* | (2013.01) |
| *H01G 9/07* | (2006.01) |

(52) U.S. Cl.
CPC .......... *H01G 9/028* (2013.01); *H01G 9/0032* (2013.01); *H01G 9/0036* (2013.01); *H01G 9/042* (2013.01); *H01G 9/07* (2013.01); *H01G 11/48* (2013.01); *H01G 11/52* (2013.01)

(58) Field of Classification Search
None
See application file for complete search history.

(56) References Cited

U.S. PATENT DOCUMENTS

| | | | | |
|---|---|---|---|---|
| 6,375,688 | B1* | 4/2002 | Akami | H01G 9/0036 |
| | | | | 29/25.03 |
| 9,818,549 | B2* | 11/2017 | Chacko | H01G 9/028 |
| 10,366,841 | B2* | 7/2019 | Uka | H01G 9/012 |
| 2005/0212094 | A1* | 9/2005 | Takagi | H01B 1/122 |
| | | | | 257/642 |
| 2008/0007893 | A1* | 1/2008 | Takagi | H01G 9/0036 |
| | | | | 361/525 |
| 2008/0232037 | A1* | 9/2008 | Biler | H01G 9/0036 |
| | | | | 361/529 |
| 2010/0165546 | A1 | 7/2010 | Yoshida et al. | |
| 2011/0309308 | A1* | 12/2011 | Meguro | C08F 220/38 |
| | | | | 252/500 |

(Continued)

FOREIGN PATENT DOCUMENTS

| | | |
|---|---|---|
| JP | 2008-109068 | 5/2008 |
| JP | 2017-037950 | 2/2017 |
| WO | 2015/133121 | 9/2015 |

*Primary Examiner* — Dion Ferguson
(74) *Attorney, Agent, or Firm* — McDermott Will and Emery LLP (57) ABSTRACT

An electrolytic capacitor includes a capacitor element. The capacitor element includes an anode body that includes a dielectric layer disposed at a surface of the anode body, a cathode body, and a separator disposed between the anode body and the cathode body. The capacitor element is impregnated with an electrolytic solution. A conductive polymer and a polyacrylic acid-based compound are provided on the dielectric layer.

13 Claims, 2 Drawing Sheets

(56) References Cited

U.S. PATENT DOCUMENTS

| | | | |
|---|---|---|---|
| 2012/0256117 A1* | 10/2012 | Sugawara | H01B 1/127 |
| | | | 252/62.2 |
| 2013/0242464 A1* | 9/2013 | Biler | H01G 9/035 |
| | | | 361/504 |
| 2016/0055981 A1* | 2/2016 | Tagawa | H01G 9/028 |
| | | | 361/527 |
| 2016/0351340 A1 | 12/2016 | Uka et al. | |
| 2017/0092426 A1* | 3/2017 | Aoyama | H01G 9/028 |
| 2017/0092428 A1* | 3/2017 | Aoyama | H01G 9/028 |
| 2018/0277312 A1* | 9/2018 | Tsubaki | H01G 9/028 |
| 2019/0074139 A1 | 3/2019 | Uka et al. | |

* cited by examiner

ELECTROLYTIC CAPACITOR AND METHOD FOR MANUFACTURING ELECTROLYTIC CAPACITOR

BACKGROUND

1. Technical Field

The present disclosure generally relates to an electrolytic capacitor and a method for manufacturing an electrolytic capacitor. Particularly, the present disclosure relates to an electrolytic capacitor having a capacitor element that includes an anode body, a cathode body, and a separator disposed between the anode body and the cathode body, and a method for manufacturing the electrolytic capacitor.

2. Description of the Related Art

Unexamined Japanese Patent Publication No. 2017-37950 discloses a solid electrolytic capacitor including a capacitor element in which anode foil having a dielectric film and cathode foil are wound with a separator disposed between the anode foil and the cathode foil. Polystyrenesulfonic acid is attached to the capacitor element. In the capacitor element, a solid electrolyte layer made of a conductive polymer is formed, and an electrolytic solution is filled in a gap portion in the capacitor element, in which the solid electrolyte layer is formed.

According to the disclosure, such an electrolytic capacitor can make equivalent series resistance (ESR) decrease.

SUMMARY

An electrolytic capacitor according to a first aspect of the present disclosure includes a capacitor element. The capacitor element includes an anode body that includes a dielectric layer disposed at a surface of the anode body, a cathode body, and a separator disposed between the anode body and the cathode body. The capacitor element is impregnated with an electrolytic solution. A conductive polymer and a polyacrylic acid-based compound are provided on the dielectric layer.

A method for manufacturing an electrolytic capacitor according to a second aspect of the present disclosure includes following first to third steps. In the first step, a capacitor element is formed. The capacitor element includes an anode body that includes a dielectric layer disposed at a surface of the anode body, a cathode body, and a separator disposed between the anode body and the cathode body. In the second step, a conductive polymer and a polyacrylic acid-based compound is provided on the dielectric layer by impregnating the capacitor element with a polymer dispersion containing the conductive polymer and the polyacrylic acid-based compound. In the third step, the capacitor element, which includes the conductive polymer and the polyacrylic acid-based compound provided on the dielectric layer, is impregnated with an electrolytic solution.

According to the present disclosure, there is advantage that an electrolytic capacitor having improved withstand voltage characteristics and a small change in equivalent series resistance can be obtained.

DETAILED DESCRIPTION OF EMBODIMENT

In the electrolytic capacitor including an electrolyte layer made of the solid electrolyte layer and the electrolytic solution, which is disclosed in Unexamined Japanese Patent Publication No. 2017-37950, impregnating performance of the electrolytic solution to the solid electrolyte layer may be low. Thus, the performance of the electrolytic solution in anodizing and repairing the dielectric film may be low. Hence, this electrolytic capacitor tends to decrease in withstand voltage characteristics as compared with an electrolytic capacitor having an electrolyte composed only of an electrolytic solution. Under a high temperature atmosphere, the conductive polymer is readily dedoped from the solid electrolyte layer. This dedoping causes conductivity of the solid electrolyte layer to decrease at times and tends to bring about a great change in equivalent series resistance.

In view of the circumstances described above, the present disclosure provides an electrolytic capacitor has improved withstand voltage characteristics and a small change in equivalent series resistance. The present disclosure also provides a method for manufacturing such an electrolytic capacitor.

1. Outline

Electrolytic capacitor 1 according to an exemplary embodiment of the present disclosure has capacitor element 10. Capacitor element 10 includes anode body 21, cathode body 22, and separator 23. Dielectric layer 210 is formed on a surface of anode body 21. Separator 23 is disposed between dielectric layer 210 of anode body 21 and cathode body 22. Capacitor element 10 is impregnated with electrolytic solution 26. A conductive polymer and a polyacrylic acid-based compound are provided on dielectric layer 210 (that is, a surface of dielectric layer 210).

In electrolytic capacitor 1 of the present exemplary embodiment, the polyacrylic acid-based compound suppresses dedoping of a dopant included in the conductive polymer. Thus, a decrease in conductivity of the conductive polymer can be small. This can suppress a change in equivalent series resistance (ESR) caused by a decrease in the conductivity of the conductive polymer.

In electrolytic capacitor 1 of the present exemplary embodiment, the polyacrylic acid-based compound improves impregnation of the conductive polymer with electrolytic solution 26. Thus, electrolytic solution 26 with which the conductive polymer is impregnated can be used for anodizing and repairing dielectric layer 210 in addition to electrolytic solution 26 with which the conductive polymer is not impregnated. This helps repair a defect of dielectric layer 210 and improve withstand voltage performance.

A method for manufacturing electrolytic capacitor 1 according to the present exemplary embodiment includes a step of forming capacitor element 10 including anode body 21 that includes dielectric layer 210 disposed at a surface of the anode body, cathode body 22, and separator 23 disposed between anode body 21 and cathode body 22. The method also includes a step of providing a conductive polymer and a polyacrylic acid-based compound on dielectric layer 210 by impregnating capacitor element 10 with a polymer dispersion containing the conductive polymer and the polyacrylic acid-based compound. The method further includes a step of impregnating capacitor element 10 including the conductive polymer and the polyacrylic acid-based compound which are provided on dielectric layer 210 with electrolytic solution 26.

The method for manufacturing electrolytic capacitor 1 according to the present exemplary embodiment includes the step of impregnating capacitor element 10 with electrolytic solution 26 after the step of providing the conductive polymer and the polyacrylic acid-based compound on dielectric layer 210. Hence, a mixture of the conductive polymer and the polyacrylic acid-based compound is readily disposed on dielectric layer 210. This facilitates manufacturing of an electrolytic capacitor that has improved withstand voltage characteristics and a small change in ESR.

2. Details 2-1. Electrolytic Capacitor

Hereinafter, a configuration of electrolytic capacitor 1 according to a present exemplary embodiment is described in detail.

Figure 1:
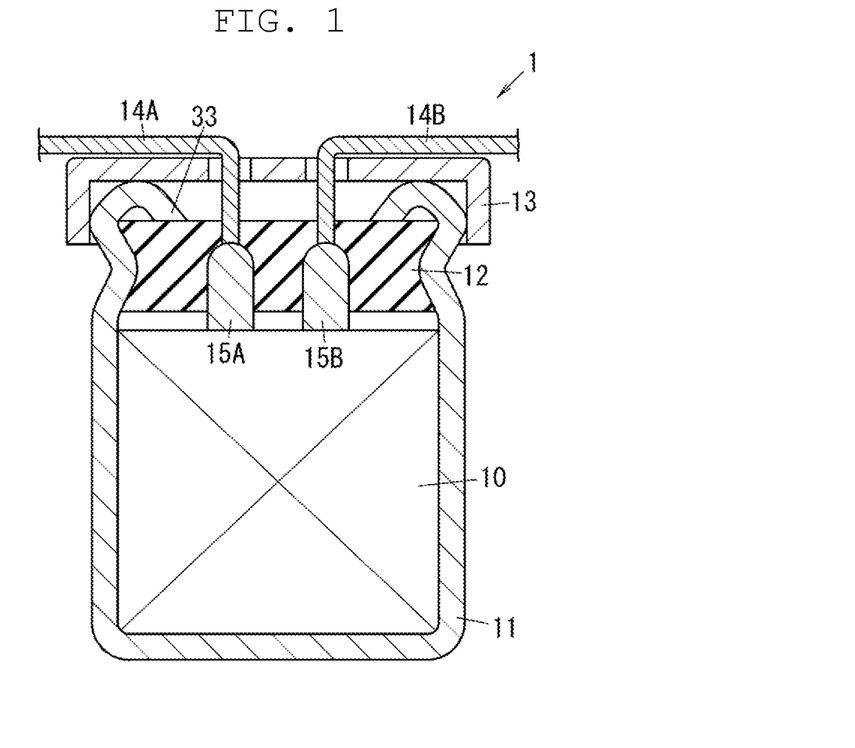
FIG. 1 is a schematic sectional view illustrating an example of an electrolytic capacitor according to an exemplary embodiment of the present disclosure.

Electrolytic capacitor 1 includes, as illustrated in FIG. 1, capacitor element 10, bottomed case 11, sealing member 12, base plate 13, lead wires 14A, 14B, and lead tabs 15A, 15B.

(1) Bottomed Case

Bottomed case 11 is configured to be capable of housing capacitor element 10. Specifically, bottomed case 11 is a tubular member having an unopened bottom and an open top. Therefore, it is possible to put capacitor element 10 into an interior space of bottomed case 11 through an opening of bottomed case 11. Bottomed case 11 is made of, for example, at least one material selected from the group consisting of aluminum, stainless steel, copper, iron, brass, and an alloy of these metals.

(2) Sealing Member and Base Plate

The opening of bottomed case 11 is covered with sealing member 12. In other words, the interior space of bottomed case 11 is hermetically sealed with sealing member 12. Sealing member 12 is made of, for example, a rubber material such as ethylene-propylene terpolymer (EPT, ethylene-propylene rubber) or isobutylene-isoprene rubber (IIR, butyl rubber), or a resin material such as an epoxy resin. Sealing member 12 has a pair of through-holes passing through in a thickness direction. Sealing member 12 has an exterior shape that is made along an inner peripheral edge of the opening of bottomed case 11. Sealing member 12 is, for example, made to be a disc shape.

Bottomed case 11 is, at its part near opening end 33, processed inward by drawing, and is, at opening end 33, curled. And thus sealing member 12 is swaged and fixed to bottomed case 11. Base plate 13 is disposed on a part of the bottomed case adjacent to sealing member 12. Base plate 13 is made of, for example, an electrically insulating resin material.

(3) Lead Wire and Lead Tab

A pair of lead wires 14A and 14B is led out through the through-holes of sealing member 12 and penetrates base plate 13. A pair of lead tabs 15A and 15B is embedded in sealing member 12. Lead tab 15A electrically connects between lead wire 14A and an electrode (anode body 21) of capacitor element 10. Lead tab 15B electrically connects between lead wire 14B and an electrode (cathode body 22) of capacitor element 10.

(4) Capacitor Element

Hereinafter, capacitor element 10 housed in bottomed case 11 is described in detail.

Figure 2:
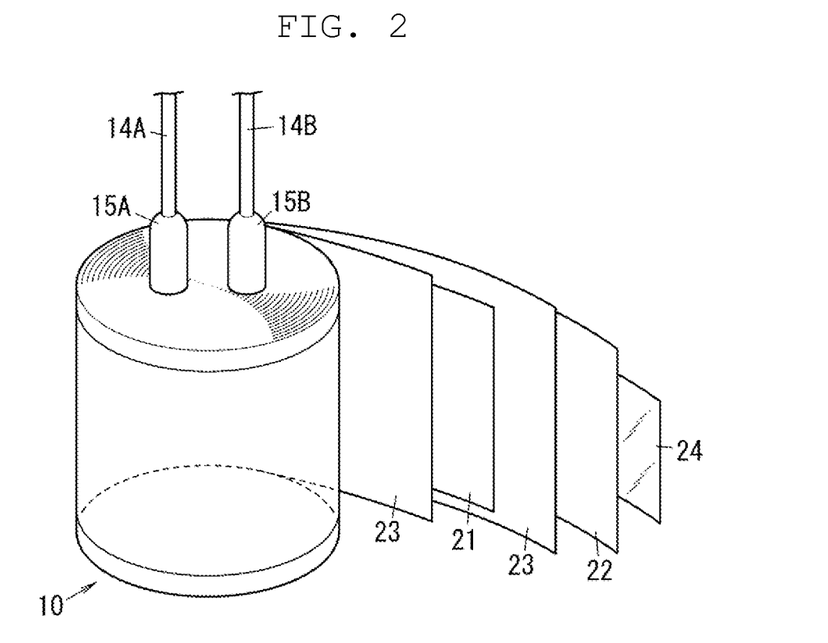
FIG. 2 is a schematic perspective view of a partially developed capacitor element included in the electrolytic capacitor according to the exemplary embodiment.

Capacitor element 10 of the present exemplary embodiment is a wound body as illustrated in FIG. 2. The wound body illustrated in FIG. 2 is capacitor element 10 that is extracted from electrolytic capacitor 1 illustrated in FIG. 1 and is partially developed.

Capacitor element 10 includes anode body 21, cathode body 22, and separator 23. In other words, anode body 21, cathode body 22, and separator 23 of capacitor element 10 are wound into the wound body with these components overlapping one another. As illustrated in FIG. 2, lead tab 15A is electrically connected to anode body 21 and lead tab 15B is electrically connected to cathode body 22. Thus, anode body 21 is electrically connected to lead wire 14A through lead tab 15A and cathode body 22 is electrically connected to lead wire 14B through lead tab 15B.

Separator 23 is disposed between anode body 21 and cathode body 22. Anode body 21, cathode body 22, and separator 23 are wound in this state. Separator 23 is, for example, a nonwoven fabric containing cellulose fibers, kraft, polyethylene terephthalate, polyphenylene sulfide, nylon, an aromatic polyamide, a polyimide, a polyamide-imide, a polyether-imide, rayon, hyaline, vinylon, or aramid fibers. In the present exemplary embodiment, separator 23 preferably contains cellulose fibers. An outermost periphery of capacitor element 10 is stuck with fastening tape 24 for fixation.

Figure 3:
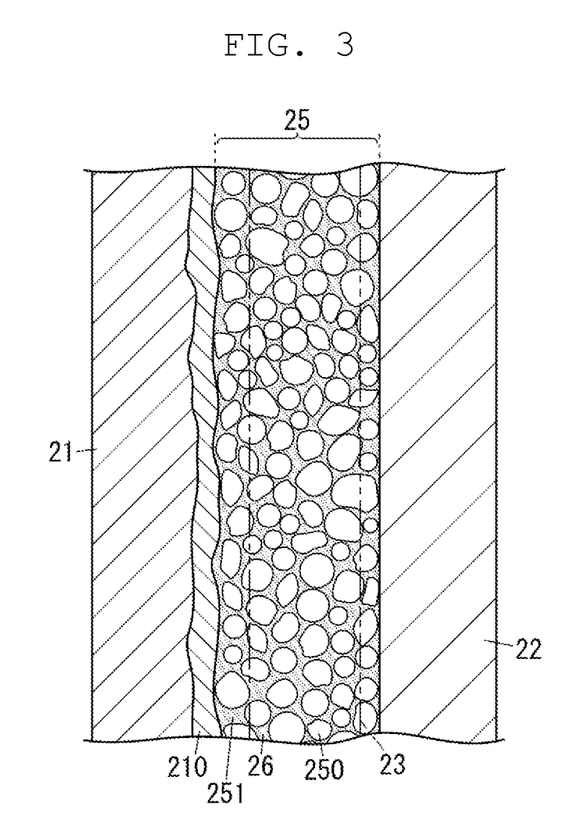
FIG. 3 is a schematic enlarged view illustrating an intervening part formed between an anode body and a cathode body in the capacitor element according to the exemplary embodiment.

In capacitor element 10, intervening part 25 is formed between anode body 21 and cathode body 22. FIG. 3 shows a schematic enlarged view illustrating this state. As illustrated in FIG. 3, separator 23 holds intervening part 25.

Intervening part 25 is in contact with dielectric layer 210 and is disposed between anode body 21 and cathode body 22. Thus, a conductive polymer and a polyacrylic acid-based compound are present on dielectric layer 210. For instance, the conductive polymer and the polyacrylic acid-based compound are attached to dielectric layer 210. Intervening part 25 may be formed on dielectric layer 210 in layers. In intervening part 25, the conductive polymer, the polyacrylic acid-based compound, and electrolytic solution 26 are mixed together. In other words, intervening part 25 contains a mixture of the conductive polymer, the polyacrylic acid-based compound, and electrolytic solution 26.

As illustrated in FIG. 3, intervening part 25 is formed such that a porous material interiorly having fine gaps contains electrolytic solution 26. In other words, intervening part 25 contains a plurality (a larger number) of particles 250 that include the conductive polymer, fine gaps 251 are each formed between adjacent particles 250, and electrolytic solution 26 exists in gaps 251. Particles 250 are internally impregnated with electrolytic solution 26 and thus particles 250 including the conductive polymer display swelling. The polyacrylic acid-based compound is present on dielectric layer 210. The polyacrylic acid-based compound is also present in gaps 251. The polyacrylic acid-based compound may be attached to surfaces of particles 250 or may be present inside particles 250.

(4-1) Anode Body

As illustrated in FIG. 3, anode body 21 includes a metal foil and dielectric layer 210 formed on a surface of the metal foil. In other words, capacitor element 10 includes anode body 21 having dielectric layer 210 formed on a surface of anode body 21.

The surface of the metal foil is roughened. This configuration provides an increase in a surface area of the metal foil, thus increasing an area of dielectric layer 210 formed on the surface of the metal foil. A roughening method is not particularly limited, and it is possible to employ, for example, an etching method. A material for the metal foil is not particularly limited, but the material is preferably, for example, a valve metal such as aluminum, tantalum, niobium, or titanium, or an alloy containing a valve metal.

Dielectric layer 210 is formed by subjecting the surface of the metal foil to an anodizing treatment. This anodizing treatment forms an oxide coating on the surface of the metal foil, and the oxide coating constitutes dielectric layer 210. As the anodizing treatment, it is possible to employ, for example, a method for applying a voltage to the metal foil while the metal foil is immersed in a treatment solution. The treatment solution is not particularly limited, and may be, for example, an ammonium adipate solution, or a solution of ammonium phosphate or ammonium borate.

(4-2) Cathode Body

As cathode body 22, it is possible to use the same metal foil as the metal foil used for manufacturing anode body 21. A surface of cathode body 22 may be roughened. On the surface of cathode body 22, a layer containing, for example, titanium or carbon may be formed.

(4-3) Conductive Polymer

In electrolytic capacitor 1, the conductive polymer acts as a solid electrolyte. Particles 250 of the conductive polymer are attached to at least a part of the surface of dielectric layer 210 and are attached to at least partly a surface of separator 23 and the surface of cathode body 22. Capacitor element 10 is impregnated with particles 250 of the conductive polymer. In this case, formation of the solid electrolyte involves impregnating capacitor element 10 with a polymer dispersion containing a solvent and particles 250 of the conductive polymer dispersed in the solvent, and then volatilizing the solvent from capacitor element 10.

The conductive polymer preferably includes, for example, at least one component selected from the group consisting of polypyrrole, polythiophene, polyaniline, and derivatives of these compounds. Examples of the derivative of polythiophene include poly(3,4-ethylenedioxythiophene) (PEDOT). The conductive polymer may contain a homopolymer or may contain a copolymer. A weight-average molecular weight of the conductive polymer is not particularly limited and ranges, for example, from 1,000 to 100,000, inclusive. An average particle size of particles 250 of the conductive polymer is not particularly limited and ranges preferably from 50 nm to 1,000 nm, inclusive, more preferably from 100 nm to 500 nm, inclusive, for example. The average particle size used in the present specification means an average value of particle sizes of grains and/or aggregates that constitute a particle size distribution peak. In particle size distribution measurement according to a dynamic light scattering method, when at least part of conductive polymer grains to be measured becomes aggregated to form an aggregate in a solvent, measured as the particle size is a particle size of the aggregate. It is possible to determine the average particle size derived from the particle size distribution peak, by particle size distribution measurement according to the dynamic light scattering method.

The conductive polymer of the present exemplary embodiment includes a polyanion. The polyanion functions as a dopant. This dopant allows the conductive polymer to exhibit electric conductivity. The polyanion is, for example, polymeric sulfonic acid. In this case, the dopant is less likely to be separated from the conductive polymer and is particularly less likely to be separated from the conductive polymer even at a high temperature, compared to cases where the conductive polymer contains a unimolecular acid component as the dopant.

As the polymeric sulfonic acid, the polyanion can includes, for example, at least one selected from the group consisting of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid.

In particular, the polyanion preferably includes polystyrenesulfonic acid. In this case, the conductive polymer is considered to be bonded with side chains of polystyrenesulfonic acid in an island shape and a dispersed manner. Thus, the dopant is less likely to be separated from the conductive polymer and is particularly less likely to be separated from the conductive polymer even at a high temperature.

(4-4) Electrolytic Solution

Capacitor element 10 is impregnated with electrolytic solution 26. Specifically, electrolytic solution 26 enters into a plurality of gaps in intervening part 25. Thus, electrolytic solution 26 is in contact with dielectric layer 210, particles 250 of the conductive polymer, and the polyacrylic acid-based compound.

Electrolytic solution 26 includes a solvent and an acid component. An oxidation action of this acid component is capable of anodizing or repairing a defect of dielectric layer 210. Specifically, in dielectric layer 210, it is possible to oxidize a metal foil-exposed part of anode body 21 to form dielectric layer 210.

The solvent of electrolytic solution 26 preferably includes a polyol solvent. The polyol solvent preferably includes at least one selected from the group consisting of ethylene glycol, glycerin, diethylene glycol, triethylene glycol, and propylene glycol. The polyol solvent is less likely to evaporate by going through a gap between bottomed case 11 and sealing member 12, is less likely to pass through sealing member 12 by diffusion or permeation because of a parameter relationship of solubility to rubber-based sealing members, and is thus capable of deterring the solvent in electrolytic solution 26 from decreasing. The polyol solvent has good compatibility with the conductive polymer and facilitates to maintain a state in which electrolytic solution 26 exists around the conductive polymer.

Other than the polyol solvent, the solvent of electrolytic solution 26 can contain, for example, at least one component selected from the group consisting of a sulfone compound, a lactone compound, a carbonate compound, and an alcohol. As the sulfone compound, the solvent can contain, for example, at least one component selected from the group consisting of sulfolane, 3-methylsulfolane, dimethyl sulfoxide, and diethyl sulfoxide. As the lactone compound, the solvent can contain, for example, at least one selected from the group consisting of γ-butyrolactone, β-butyrolactone, α-valerolactone, and γ-valerolactone. As the carbonate compound, the solvent can contain, for example, at least one component selected from the group consisting of dimethyl carbonate (DMC), diethyl carbonate (DEC), ethyl methyl carbonate (EMC), ethylene carbonate (EC), propylene carbonate (PC), and fluoroethylene carbonate (FEC). As the alcohol, the solvent can contain at least one selected from the group consisting of methanol, ethanol, prop anol, butanol, cyclobutanol, cyclohexanol, methyl cellosolve, and ethyl cellosolve.

The acid component preferably includes an organic acid. As the organic acid, the acid component can include, for example, at least one selected from the group consisting of phthalic acid, isophthalic acid, terephthalic acid, maleic acid, adipic acid, benzoic acid, toluic acid, enanthic acid, malonic acid, 1,6-decanedicarboxylic acid, 1,7-octanedicarboxylic acid, azelaic acid, salicylic acid, oxalic acid, and glycolic acid.

The acid component may includes an inorganic acid. As the inorganic acid, the acid component can includes, for example, at least one selected from the group consisting of boric acid, phosphoric acid, phosphorus acid, hypophosphorus acid, borate ester, phosphate ester, carbonic acid, and silicic acid.

The acid component also preferably includes, for example, a composite acid compound of the organic acids and the inorganic acids described above. As the composite acid compound, the acid component preferably contains at least one selected from the group consisting of borodisalicylic acid, borodiglycolic acid, and borodlioxalic acid.

Further, a polymeric acid component may be used as the acid component. As the polymeric acid component, the acid component can include, for example, at least one selected from the group consisting of polyacrylic acid, polymethacrylic acid, polyvinylsulfonic acid, polystyrenesulfonic acid, polyallylsulfonic acid, polyacrylsulfonic acid, polymethacrylsulfonic acid, poly(2-acrylamido -2-methyl-propanesulfonic acid), and polyisoprenesulfonic acid.

Electrolytic capacitor 1 sometimes generates heat due to a flow of ripple current. In such a case, the composite acid compound and the polymeric acid component are preferable because the composite acid compound and the polymeric acid component have excellent thermal stability.

Electrolytic solution 26 can include a component other than the solvent and the acid component. Electrolytic solution 26 can include, for example, a base component. In this case, it is possible to neutralize at least part of the acid component and thus suppress corrosion of an electrode attributed to the acid component while increasing a concentration of the acid component.

In electrolytic solution 26, an equivalent ratio of the acid component is preferably greater than an equivalent ratio of the base component. In this case, it is possible to effectively suppress a dedoping phenomenon. The equivalent ratio of the acid component to the base component preferably ranges from 1.0 to 30, inclusive. A concentration of the base component in the liquid component ranges preferably from 0.1 wt % to 20 wt %, inclusive, more preferably from 3 wt % to 10 wt %, inclusive.

The base component preferably contains at least one component selected from the group consisting of a primary amine compound, a secondary amine compound, a tertiary amine compound, an ammonium compound, a quaternary ammonium compound, and an amidine compound. These components have high heat resistance to be capable of suppressing degradation of electrolytic solution 26 attributed to heat. Examples of these components include methylamine, dimethylamine, trimethylamine, dimethylethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, pyridine, pyridazine, pyrimidine, pyrazine, 4-dimethylaminopyridine, ammonium, diethyldimethylammonium, 1,2,3-trimethylimidazolinium, 1,2,3,4-tetramethylimidazolinium, 1,3-dimethyl-2-ethyl-imidazolinium, 1,3,4-trimethyl-2-ethylimidazolinium, and a 1,3-dimethyl-2-heptylimidazolinium salt. The base component can includes at least one of these components.

The electrolytic solution may also include a component other than the solvent, the acid component, and the base component, such as an additive agent.

A pH of electrolytic solution 26 is preferably less than or equal to 4, more preferably less than or equal to 3.8, further preferably less than or equal to 3.6. Electrolytic solution 26 having a pH of less than or equal to 4 easily suppresses the dedoping phenomenon. A lower limit value of the pH of electrolytic solution 26 is not particularly limited and is, for example, more than or equal to 2.0.

(4-5) Polyacrylic Acid-Based Compound

In the present exemplary embodiment, the polyacrylic acid-based compound contains a polymer including an acrylic acid unit [—$CH_2CR_1(COOR_2)$—] and a derivative of this polymer. In the formula, $R_1$ and $R_2$ may be identical or different elements. Each of $R_1$ and $R_2$ may represent, for example, a hydrogen atom, an alkyl group having 1 to 4 carbon atoms, such as a methyl group and an ethyl group, a hydroxyalkyl group having 1 to 4 carbon atoms, such as a hydroxyethyl group and hydroxypropyl, an aryl group that may have at least one substituent such as a phenyl group and a benzyl group, or a sodium atom.

In particular, the polyacrylic acid-based compound preferably includes at least one of an acrylic acid polymer and a methacrylic acid polymer. Further, the polyacrylic acid-based compound preferably includes a copolymer of an acrylic acid and a methacrylic acid. In other words, the polyacrylic acid-based compound is preferably a copolymer including an acrylic acid unit [—$CH_2CH(COOH)$—] and a methacrylic acid unit [—$CH_2CCH_3(COOH)$—]. The copolymer may be a random copolymer or a block copolymer. A mole ratio of the acrylic acid unit to the methacrylic acid unit (the acrylic acid unit/methacrylic acid unit) preferably ranges from 0.3 to 5.0, inclusive, more preferably from 0.5 to 4.0, inclusive, and further preferably from 1.0 to 3.0, inclusive. The mole ratio of the acrylic acid unit to the methacrylic acid unit is preferably high. This facilitates to exhibit an effect of the polyacrylic acid-based compound included in the intervening part.

In electrolytic capacitor 1 of the present exemplary embodiment, the polyacrylic acid-based compound can suppress dedoping of the dopant contained in the conductive polymer. Electrolytic capacitor 1 of the present exemplary embodiment includes a polyanion as the dopant to enable the conductive polymer to display high conductivity. The polyacrylic acid-based compound suppress detachment of this polyanion. The conductive polymer is acidic, while electrolytic solution 26, which exists around the conductive polymer, is closer to neutral than the conductive polymer is. In other words, since the conductive polymer and electrolytic solution 26 which have different pH from each other coexist, dedoping is likely to occur. Moreover, in the present exemplary embodiment, if the solvent of electrolytic solution 26 contains a polyol solvent, the solvent is likely to permeate into the conductive polymer. Thus, the conductive polymer readily swells, and this facilitates dedoping of the dopant in the conductive polymer. In contrast, in the present exemplary embodiment, the polyacrylic acid-based compound is present near the conductive polymer. Hence, the polyacrylic acid-based compound hinders the action of electrolytic solution 26 on the conductive polymer, and thus ensure that dedoping is less likely to occur. Accordingly, the electrolytic capacitor of the present exemplary embodiment allows a decrease in conductivity of the conductive polymer caused by dedoping to be smaller, reducing a change in equivalent series resistance (ESR) caused by a decrease in the conductivity of the conductive polymer.

In electrolytic capacitor 1 of the present exemplary embodiment, the polyacrylic acid-based compound provided on dielectric layer 210 contributes to an improvement in the impregnation of a vicinity of dielectric layer 210 with electrolytic solution 26, and thus allows electrolytic solution 26 to display properties for anodizing and repairing dielectric layer 210. In other words, even if the conductive polymer is formed on dielectric layer 210, the polyacrylic acid-based compound provided on dielectric layer 210 enables electrolytic solution 26 to readily reach the vicinity of dielectric layer 210 and repair dielectric layer 210. This helps repair a defect of dielectric layer 210 and improve withstand voltage performance. The polyacrylic acid-based compound is a water-soluble polymer and is capable of retaining water component. The repair of dielectric layer 210 by electrolytic solution 26 is caused by an action performed by the acid component in electrolytic solution 26. However, water component is preferably present while this acid component is acting on dielectric layer 210. Although electrolytic solution 26 slightly includes water component, the electrolytic solution mostly includes an organic solvent. Thus, in order to improve the performance of repair of dielectric layer 210, the acid component can utilize not only the water component in electrolytic solution 26 but also the water component retained by the polyacrylic acid-based compound, i.e. a water-soluble polymer, so as to efficiently repair dielectric layer 210.

In the present exemplary embodiment, the polyacrylic acid-based compound has a weight-average molecular weight that preferably ranges from 5,000 to 100,000, inclusive. More preferably, the weight-average molecular weight of the polyacrylic acid-based compound ranges from 10,000 to 100,000, inclusive. Further preferably, the weight-average molecular weight of the polyacrylic acid-based compound ranges from 40,000 to 80,000, inclusive. When the weight-average molecular weight of the polyacrylic acid-based compound ranges from 5,000 to 100,000, inclusive, the polyacrylic acid-based compound is likely to exist near the conductive polymer, and thus the polyacrylic acid-based compound readily produces an effect. The weight-average molecular weight of the polyacrylic acid-based compound is measured using a gel permeation chromatography (GPC) analysis method.

In the present exemplary embodiment, a content ratio of the polyacrylic acid-based compound preferably ranges from 0.05 parts by mass to 5 parts by mass, inclusive with respect to 100 parts by mass of the solvent of electrolytic solution 26. When the content ratio of the polyacrylic acid-based compound is less than 0.05 parts by mass with respect to 100 parts by mass of the solvent of electrolytic solution 26, the effect of repair of dielectric layer 210 by electrolytic solution 26 and the water component is likely to decline because the content of the polyacrylic acid-based compound is too small. When the content ratio of the polyacrylic acid-based compound is greater than 5 parts by mass with respect to 100 parts by mass of the solvent of electrolytic solution 26, the effect of anodization and repair of dielectric layer 210 is likely to decline because the polyacrylic acid-based compound is too thickly attached to dielectric layer 210 so that the action of electrolytic solution 26 on dielectric layer 210 is inhibited. Thus, the effect of anodization and repair of dielectric layer 210 is likely to decrease.

In the present exemplary embodiment, a content ratio of the polyacrylic acid-based compound preferably ranges from 2 parts by mass to 85 parts by mass, inclusive with respect to 100 parts by mass of the conductive polymer. When the content ratio of the polyacrylic acid-based compound is less than 2 parts by mass with respect to 100 parts by mass of the conductive polymer, dedoping from the conductive polymer is less likely to decrease because the content of the polyacrylic acid-based compound is too small. When the content ratio of the polyacrylic acid-based compound is greater than 85 parts by mass with respect to 100 parts by mass of the conductive polymer, the conductivity of the conductive polymer is likely to decrease because the content of the polyacrylic acid-based compound is too large. More preferably, the content ratio of the polyacrylic acid-based compound ranges from 5 parts by mass to 50 parts by mass, inclusive with respect to 100 parts by mass of the conductive polymer.

2-2. Method for Manufacturing Electrolytic Capacitor

A method for manufacturing electrolytic capacitor 1 according to the present exemplary embodiment will be described. The method for manufacturing electrolytic capacitor 1 according to the present exemplary embodiment includes a first step, a second step, a third step, and a fourth step.

(1) First Step

In the first step, capacitor element 10 is produced. Capacitor element 10 includes anode body 21 that includes dielectric layer 210 formed on a surface of anode body 21, cathode body 22, and separator 23 disposed between anode body 21 and cathode body 22. Preferably, in the first step, production of anode body 21, production of cathode body 22, and production of capacitor element 10 are performed.

(1-1) Production of Anode Body

A metal foil as a raw material for anode body 21 is prepared. Specifically, it is possible to produce anode body 21 by cutting a large roll-shaped metal plate.

By roughening a surface of this metal foil, a plurality of fine projections and recesses can be formed on the surface of the metal foil. It is possible to roughen the surface of the metal foil by, for example, etching the metal foil. As the etching, it is possible to employ, for example, a direct current electrolytic method or an alternate current electrolytic method.

Next, dielectric layer 210 is formed on the roughened surface of the metal foil. A method for forming dielectric layer 210 is not particularly limited, and it is possible to form the dielectric layer by, for example, subjecting the metal foil to an anodizing treatment. In the anodizing treatment, the roughened metal foil is, for example, immersed in an anodizing treatment solution such as a solution of ammonium adipate, ammonium phosphate, or ammonium borate, and then heated or subjected to voltage application. These procedures give anode body 21 including dielectric layer 210 formed on the surface of anode body 21. Lead wire 14A is electrically connected to anode body 21. A method for connecting anode body 21 to lead wire 14A is not particularly limited, and it is possible to use, for example, swage joining or ultrasonic welding. In the present exemplary embodiment, anode body 21 is electrically connected to lead wire 14A through lead tab 15A.

(1-2) Production of Cathode Body

It is possible to produce cathode body 22 from a metal foil by the same method as for anode body 21. Specifically, it is possible to produce cathode body 22 by cutting a large roll-shaped metal plate.

Lead wire 14B is electrically connected to cathode body 22. A method for connecting cathode body 22 to lead wire 14B is not particularly limited, and it is possible to use, for example, swage joining or ultrasonic welding. In the present exemplary embodiment, cathode body 22 is electrically connected to lead wire 14B through lead tab 15B.

As necessary, a surface of cathode body 22 may be roughened, or a layer including an oxide coating or a conductive layer of, for example, titanium or carbon may be formed on a surface of cathode body 22.

(1-3) Production of Capacitor Element

Using anode body 21, cathode body 22, and separator 23 described above, a wound body (capacitor element 10) illustrated in FIG. 2 is produced. Specifically, anode body 21, separator 23, and cathode body 22 are stacked in this order and concentrically wound to produce a wound body. An end of cathode body 22 positioned at an outermost layer of the wound body is fixed with fastening tape 24. These procedures enable production of capacitor element 10 illustrated in FIG. 2. Further, lead wires 14A, 14B drawn out from anode body 21 and cathode body 22 are led out from through-holes in sealing member 12, and then sealing member 12 is disposed.

(2) Second Step

In the second step, capacitor element 10 is impregnated with a polymer dispersion. This polymer dispersion contains a solvent, particles 250 of a conductive polymer dispersed in the solvent, and a polyacrylic acid-based compound. The solvent is not particularly limited and may be water or a nonaqueous solvent. Here, the term "nonaqueous solvent" is a generic name representing solvents other than a solvent containing water (including water), and nonaqueous solvent includes organic solvents and ionic liquids. In particular, the solvent is preferably a polar solvent. The polar solvent may be a protic solvent or an aprotic solvent.

In the second step, a mixture of the conductive polymer and the polyacrylic acid-based compound is attached to and disposed (formed) on a surface of dielectric layer 210. At the same time, the conductive polymer and the polyacrylic acid-based compound are attached to and formed on a surface of separator 23 and the surface of cathode body 22.

The step of impregnating capacitor element 10 with the polymer dispersion may be repeated two or more times. In this case, amount of the conductive polymer and the polyacrylic acid-based compound which are in contact with dielectric layer 210 can be increased.

(3) Third Step

In the third step, capacitor element 10, which has been impregnated with the polymer dispersion, is impregnated with electrolytic solution 26. In other words, the method for manufacturing electrolytic capacitor 1 according to the present exemplary embodiment includes the third step to impregnate capacitor element 10 with electrolytic solution 26 after the second step in which a material (a layer) having the mixture of the polyacrylic acid-based compound and the conductive polymer is disposed on the surface of dielectric layer 210. In this process, fine gaps 251 formed by particles 250 are impregnated with electrolytic solution 26, and then intervening part 25 is formed. Electrolytic solution 26 is in contact with dielectric layer 210, as well as the conductive polymer and the polyacrylic acid-based compound.

(4) Fourth Step

In the fourth step, capacitor element 10 is, after the third step, encapsulated in bottomed case 11 to complete electrolytic capacitor 1. At first, capacitor element 10 is housed in bottomed case 11 so that lead wires 14A, 14B are positioned on an opening side of bottomed case 11. And then sealing member 12, which has been formed so as to allow lead wires 14A, 14B to penetrate sealing member 12, is disposed above capacitor element 10 so that capacitor element 10 is encapsulated in bottomed case 11. Lastly, bottomed case 11 is, at part near an opening end, processed by drawing and is further curled at the opening end, and then base plate 13 is disposed on curled part.

These steps give electrolytic capacitor 1 illustrated in FIG. 1. Then, an aging treatment of applying a rated voltage may be performed.

2-3. Use Application of Electrolytic Capacitor

Use application of electrolytic capacitor 1 is not particularly limited. Electrolytic capacitor 1 is usable in, for example, a substrate for an engine control unit (ECU) of an automobile or in a switching power source. This automobile is assumed to be mainly, for example, an electric car or a hybrid car but may also be a gasoline engine car or a diesel engine car. Electrolytic capacitor 1 may also be used in, for example, a two-wheel vehicle (including an electric motorcycle), an aircraft, a ship, and a drone. Electrolytic capacitor 1 may also be used in, for example, a power-supply device for a central processing unit (CPU) of a server device, a computer device, a home-use game machine, and the like. In addition, electrolytic capacitor 1 may also be used in, for example, a power-supply device for a field-programmable gate array (FPGA) in a communication device, industrial equipment, and the like as well as a power-supply device for a graphics processing unit (GPU) in a graphic board and the like. The use application of electrolytic capacitor 1 is not limited to these examples, but the electrolytic capacitor is usable in various fields.

3. Modified Examples

The exemplary embodiment is merely one of various exemplary embodiments of the present disclosure. Various modifications may be made to the exemplary embodiment to suit design or other requirements as long as the object of the present disclosure is fulfilled.

In the method for manufacturing electrolytic capacitor 1 described above, capacitor element 10 is impregnated with the polymer dispersion containing the conductive polymer and the polyacrylic acid-based compound, and then capacitor element 10 is impregnated with electrolytic solution 26. The scope of the present disclosure is not limited to this example. In other words, capacitor element 10 may be impregnated with a polymer dispersion containing a conductive polymer, then be impregnated with a solution (a polymer dispersion) containing a polyacrylic acid-based compound, and then be impregnated with electrolytic solution 26.

In another example of the method for manufacturing electrolytic capacitor 1, capacitor element 10 may be impregnated with a polymer dispersion containing a conductive polymer and then be impregnated with electrolytic solution 26 containing a polyacrylic acid-based compound.

EXAMPLES

Hereinafter, the method for manufacturing electrolytic capacitor 1 according to the present exemplary embodiment is described in more detail based on examples. The method for manufacturing electrolytic capacitor 1, however, is not limited to contents of the examples below.

Examples 1 to 10 and Comparative Examples 1 and 2

Hereinafter, a method for manufacturing electrolytic capacitors according to Examples 1 to 10 and Comparative Examples 1 and 2 is specifically described.

Preparation of Anode Body

A 100 μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 45 V to the aluminum foil. Then, the aluminum foil was cut into a size of 9 mm (length)×220 mm (width) to prepare an anode body.

Preparation of Cathode Body

A 50 μm-thick aluminum foil was subjected to etching to roughen a surface of the aluminum foil. Then, the aluminum foil was cut into a size of 9 mm (length)×230 mm (width) to prepare a cathode body.

Production of Wound Body

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively.

Preparation of Polymer Dispersion

A mixed solution was prepared by mixing 3,4-ethylenethoxythiophene and a polymer dopant, i.e., polystyrenesulfonic acid (PSS, weight-average molecular weight 100, 000) in ion-exchanged water (liquid component). While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion was obtained that contained about 5% by mass of poly(3,4-ethylenedioxythiophene) doped with PSS (PEDOT/PSS).

The polymer dispersion was mixed with a polyacrylic acid-based compound. As the polyacrylic acid-based compound, a copolymer of an acrylic acid and a methacrylic acid or an acrylic acid polymer was used. Table 1 shows weight-average molecular weights of the polyacrylic acid-based compounds and mole ratios between the acrylic acids and the methacrylic acids.

Attachment of Conductive Polymer and Polyacrylic Acid-Based Compound

The wound body was immersed in the polymer dispersion housed in a predetermined container in a reduced-pressure atmosphere (40 kPa) for 5 minutes, and then the wound body was picked up from the polymer dispersion. Next, the wound body, which had been impregnated with the polymer dispersion, was dried in a drying furnace at 150° C. for 20 minutes so that the conductive polymer and the polyacrylic acid-based compound are attached to the dielectric layer so as to cover at least a part of the dielectric layer.

Preparation of Electrolytic Solution

As a solvent of an electrolytic solution, ethylene glycol and sulfolane were used. As an acid component for a solute, phthalic acid was used. As a base component for the solute, triethylamine was used. The solvent and the solute were used to prepare an electrolytic solution.

As the electrolytic solution, a solution that was obtained by dissolving phthalic acid and triethylamine as the solute in the solvent was used. The solvent contains sulfolane (SL) and ether ethylene glycol (EG) or γ-butyrolactone (GBL) at a mass ratio of 1:1. In the electrolytic solution, a concentration of the phthalic acid component was 20 wt % and a concentration of the triethylamine component was 5 wt %.

Impregnation with Electrolytic Solution

The capacitor element was immersed in the electrolytic solution in a reduced-pressure atmosphere (40 kPa) for 5 minutes to impregnate the capacitor element with the electrolytic solution. In this way, an intervening part that included the conductive polymer, the polyacrylic acid-based compound, and the electrolytic solution was formed. The intervening part included 0.5 part by mass of the polyacrylic acid-based compound with respect to 100 parts by mass of the solvent of the electrolytic solution. The intervening part included 25 parts by mass of the polyacrylic acid-based compound with respect to 100 parts by mass of the conductive polymer.

Encapsulation of Capacitor Element

The capacitor element that had been impregnated with the electrolytic solution was encapsulated to complete an electrolytic capacitor. Specifically, the capacitor element was housed in a bottomed case so that lead wires were positioned on an opening side of the bottomed case. And a sealing member (an elastic material including butyl rubber as a rubber component) that had been formed so as to allow the lead wires to penetrate the sealing member was disposed above the capacitor element so that the capacitor element was encapsulated in the bottomed case. Then, the bottomed case was, at part near an opening end, processed by drawing and was further curled at the opening end, and then a base plate was disposed on curled part to complete the electrolytic capacitor illustrated in FIG. 1. Finally, an aging treatment of applying a voltage of 32 V was performed at 100° C. for 2 hours.

Evaluation

Withstand Voltage

A withstand voltage was measured by applying voltage to the electrolytic capacitor at an increasing rate of 0.1 V/s. A voltage at the time when leakage current exceeded a current value calculated by a formula of a rated voltage x an electrostatic capacitance×0.1 (0.1 CV) was measured and was taken as a withstand voltage for the electrolytic capacitor.

ESR Change Ratio

An ESR value (initial ESR value) (mΩ) of the electrolytic capacitor was measured at a frequency of 100 kHz, in an environment of 20° C., using a 4-terminal LCR meter.

Next, after a rated voltage (25 V) had been applied to the electrolytic capacitor at a temperature of 145° C. for 1,000 hours, an ESR value (post-high temperature ESR value) (mΩ) was measured by the same method as described above.

ESR change ratio (%) represents [100×(post-high temperature ESR value)/(initial ESR value)].

2. This is considered to be because those of Examples 1 to 10 each contain the polyacrylic acid-based compound.

Conclusion

Electrolytic capacitor (1) according to a first aspect includes capacitor element (10) that includes anode body (21) including dielectric layer (210) disposed at a surface of anode body (21), cathode body (22), and separator (23) disposed between anode body (21) and cathode body (22). Capacitor element (10) is impregnated with electrolytic solution (26). A conductive polymer and a polyacrylic acid-based compound are provided on dielectric layer (210).

In this case, there is advantage that electrolytic capacitor (1) that has improved withstand voltage characteristics and a small change in equivalent series resistance can be obtained owing to the polyacrylic acid-based compound.

Electrolytic capacitor (1) according to a second aspect is based on the electrolytic capacitor of the first aspect, wherein a layer including a mixture of the conductive polymer, the polyacrylic acid-based compound, and electrolytic solution (26) is provided on dielectric layer (210).

In this case, there is advantage that electrolytic capacitor (1) that has further improved withstand voltage characteristics and a smaller change in equivalent series resistance can be obtained.

Electrolytic capacitor (1) according to a third aspect is based on the electrolytic capacitor of the first or the second aspect, wherein electrolytic solution (26) includes a polyol solvent as a solvent.

In this case, there is advantage that electrolytic capacitor (1) that is less likely to deteriorate in performance caused by a decrease in quantity of the solvent can be obtained.

Electrolytic capacitor (1) according to a fourth aspect is based on the electrolytic capacitor of the third aspect,

TABLE 1

|  | Polyacrylic acid-based compound | Weight-average molecular weight | Acrylic acid:methacrylic acid (mole ratio) | Electrolytic solution solvent | Withstand voltage [V] | ESR change ratio (%) |
|---|---|---|---|---|---|---|
| Example 1 | Copolymer of acrylic acid and methacrylic acid | 80,000 | 2.7:1.0 | EG + SL | 202.7 | 133.3 |
| Example 2 | Copolymer of acrylic acid and methacrylic acid | 80,000 | 1.0:1.0 | EG + SL | 196.5 | 146.1 |
| Example 3 | Copolymer of acrylic acid and methacrylic acid | 80,000 | 1.0:2.7 | EG + SL | 192.2 | 153.6 |
| Example 4 | Copolymer of acrylic acid and methacrylic acid | 5,000 | 2.7:1.0 | EG + SL | 189.6 | 138.5 |
| Example 5 | Copolymer of acrylic acid and methacrylic acid | 10,000 | 2.7:1.0 | EG + SL | 190.5 | 136.4 |
| Example 6 | Copolymer of acrylic acid and methacrylic acid | 40,000 | 2.7:1.0 | EG + SL | 191.2 | 134.4 |
| Example 7 | Copolymer of acrylic acid and methacrylic acid | 100,000 | 2.7:1.0 | EG + SL | 204.7 | 170.6 |
| Example 8 | Copolymer of acrylic acid and methacrylic acid | 100,000 | 2.7:1.0 | GBL + SL | 155.6 | 174.2 |
| Example 9 | Polyacrylic acid | 9,000 | — | EG + SL | 188.0 | 143.6 |
| Example 10 | Polyacrylic acid | 50,000 | — | EG + SL | 194.1 | 138.8 |
| Comparative Example 1 | — | — | — | EG + SL | 178.6 | 201.5 |
| Comparative Example 2 | — | — | — | GBL + SL | 146.2 | 205.1 |

The electrolytic capacitors of Examples 1 to 10 have high withstand voltages and low ESR change ratios as compared with electrolytic capacitors of Comparative Examples 1 and wherein the polyol solvent includes at least one selected from the group consisting of ethylene glycol, glycerin, diethylene glycol, triethylene glycol, and propylene glycol.

In this case, there is advantage that electrolytic capacitor (1) that is much less likely to deteriorate in performance caused by a decrease in quantity of the solvent can be obtained.

Electrolytic capacitor (1) according to a fifth aspect is based on the electrolytic capacitor of any one of the first to the fourth aspects, wherein the conductive polymer includes a polyanion.

In this case, conductivity of the conductive polymer can be improved.

Electrolytic capacitor (1) according to a sixth aspect is based on the electrolytic capacitor of any one of the first to the fifth aspects, wherein the polyacrylic acid-based compound includes an acrylic acid unit and a methacrylic acid unit.

In this case, there is advantage that electrolytic capacitor (1) that has further improved withstand voltage characteristics and a smaller change in equivalent series resistance can be obtained.

Electrolytic capacitor (1) according to a seventh aspect is based on the electrolytic capacitor of the sixth aspect, wherein a mole ratio of the acrylic acid unit to the methacrylic acid unit in the polyacrylic acid-based compound ranges from 0.3 to 5.0, inclusive.

In this case, there is advantage that electrolytic capacitor (1) that has further improved withstand voltage characteristics and a smaller change in equivalent series resistance can be obtained.

Electrolytic capacitor (1) according to an eighth aspect is based on the electrolytic capacitor of any one of the first to the seventh aspects, wherein a weight-average molecular weight of the polyacrylic acid-based compound ranges from 5,000 to 100,000, inclusive.

In this case, there is advantage that electrolytic capacitor (1) that has further improved withstand voltage characteristics and a smaller change in equivalent series resistance can be obtained.

Electrolytic capacitor (1) according to a ninth aspect is based on the electrolytic capacitor of any one of the first to the eighth aspects, wherein a content ratio of the polyacrylic acid-based compound ranges from 0.05 parts by mass to 5 parts by mass, inclusive with respect to 100 parts by mass of a solvent of electrolytic solution (26).

In this case, there is advantage that electrolytic capacitor (1) that has further improved withstand voltage characteristics and a smaller change in equivalent series resistance can be obtained.

Electrolytic capacitor (1) according to a tenth aspect is based on the electrolytic capacitor of any one of the first to the ninth aspects, wherein a content ratio of the polyacrylic acid-based compound ranges from 2 parts by mass to 85 parts by mass, inclusive with respect to 100 parts by mass of the conductive polymer.

In this case, there is advantage that electrolytic capacitor (1) that has further improved withstand voltage characteristics and a smaller change in equivalent series resistance can be obtained.

A method for manufacturing electrolytic capacitor (1) according to an eleventh aspect includes: the step of forming capacitor element (10) including anode body (21) that includes dielectric layer (210) disposed at a surface of the anode body, cathode body (22), and separator (23) disposed between anode body (21) and cathode body (22); the step of providing a conductive polymer and a polyacrylic acid-based compound on dielectric layer (210) by impregnating capacitor element (10) with a polymer dispersion containing the conductive polymer and the polyacrylic acid-based compound; and the step of impregnating capacitor element (10) including the conductive polymer and the polyacrylic acid-based compound disposed on dielectric layer (210) with electrolytic solution (26).

In this case, there is advantage that electrolytic capacitor (1) that has improved withstand voltage characteristics and a small change in equivalent series resistance owing to the polyacrylic acid-based compound.

What is claimed is:

1. An electrolytic capacitor comprising a capacitor element, the capacitor element including:
    an anode body that includes a dielectric layer disposed at a surface of the anode body;
    a cathode body; and
    a separator disposed between the anode body and the cathode body,
    wherein:
    the capacitor element is impregnated with an electrolytic solution,
    a conductive polymer and a polyacrylic acid-based compound are provided on the dielectric layer,
    the polyacrylic acid-based compound includes an acrylic acid unit and a methacrylic acid unit, and
    a mole ratio of the acrylic acid unit to the methacrylic acid unit in the polyacrylic acid-based compound ranges from 0.3 to 5.0, inclusive.

2. The electrolytic capacitor according to claim 1, wherein a layer including a mixture of the conductive polymer, the polyacrylic acid-based compound, and the electrolytic solution is provided on the dielectric layer.

3. The electrolytic capacitor according to claim 1, wherein the electrolytic solution includes a polyol solvent as a solvent.

4. The electrolytic capacitor according to claim 3, wherein the polyol solvent includes at least one selected from the group consisting of ethylene glycol, glycerin, diethylene glycol, methylene glycol, and propylene glycol.

5. The electrolytic capacitor according to claim 1, wherein the conductive polymer includes a polyanion.

6. The electrolytic capacitor according to claim 1, wherein a weight-average molecular weight of the polyacrylic acid-based compound ranges from 5,000 to 100,000, inclusive.

7. The electrolytic capacitor according to claim 1, wherein a content ratio of the polyacrylic acid-based compound ranges from 0.05 parts by mass to 5 parts by mass, inclusive, with respect to 100 parts by mass of a solvent of the electrolytic solution.

8. The electrolytic capacitor according to claim 1, wherein a content ratio of the polyacrylic acid-based compound ranges from 2 parts by mass to 85 parts by mass, inclusive, with respect to 100 parts by mass of the conductive polymer.

9. A method for manufacturing an electrolytic capacitor, the method comprising the steps of:
    forming a capacitor element including an anode body that includes a dielectric layer disposed at a surface of the anode body, a cathode body, and a separator disposed between the anode body and the cathode body;
    providing a conductive polymer and a polyacrylic acid-based compound on the dielectric layer by impregnating the capacitor element with a polymer dispersion containing the conductive polymer and the polyacrylic acid-based compound; and
    impregnating the capacitor element with an electrolytic solution, the capacitor element including the conductive polymer and the polyacrylic acid-based compound which are provided on the dielectric layer, wherein:

the polyacrylic acid-based compound includes an acrylic acid unit and a methacrylic acid unit, and a mole ratio of the acrylic acid unit to the methacrylic acid unit in the polyacrylic acid-based compound ranges from 0.3 to 5.0, inclusive.

10. The method according to claim 9, wherein the electrolytic solution includes a polyol solvent as a solvent.

11. The method according to claim 10, wherein the polyol solvent includes at least one selected from the group consisting of ethylene glycol, glycerin, diethylene glycol, triethylene glycol, and propylene glycol.

12. The method according to claim 9, wherein the conductive polymer includes a polyanion.

13. The method according to claim 9, wherein a weight-average molecular weight of the polyacrylic acid-based compound ranges from 5,000 to 100,000, inclusive.

* * * * *